(12) United States Patent
Shimovetz

(10) Patent No.: US 6,286,789 B1
(45) Date of Patent: Sep. 11, 2001

(54) CONFIGURABLE AERIAL VEHICLE AEROSURFACE

(75) Inventor: Ralph Shimovetz, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/496,138

(22) Filed: Feb. 1, 2000

(51) Int. Cl.$^7$ .................. B64C 9/00; B64C 3/00; B64C 5/00; F42B 10/00; F42B 15/01
(52) U.S. Cl. .................. 244/201; 244/198; 244/3.26
(58) Field of Search .................. 244/72, 11, 22, 244/113, 198, 201, 207, 3.27, 3.24, 3.26

(56) References Cited

U.S. PATENT DOCUMENTS

| | | | |
|---|---|---|---|
| 935,039 | * 9/1909 | Malasomma | 244/22 |
| 1,464,356 | * 8/1923 | Fedoryszak | 244/11 |
| 1,702,645 | * 2/1929 | Ehrlich | 244/22 |
| 1,889,477 | * 11/1932 | Hitt | 244/204 |
| 4,884,766 | * 12/1989 | Steinmetz et al. | 244/3.27 |
| 5,085,381 | 2/1992 | Spiroff et al. . | |
| 5,192,037 | 3/1993 | Moorefield . | |

* cited by examiner

Primary Examiner—Charles T. Jordan
Assistant Examiner—Christian M. Best
(74) Attorney, Agent, or Firm—Richard A. Lambert; Bobby D. Scearce; Thomas L. Kundert

(57) ABSTRACT

A configurable aerial vehicle aerosurface is disclosed, The configurable aerial vehicle aerosurface includes first and second airfoil surfaces in sliding engagement. A plurality of apertures pass transversely through the airfoil surfaces and are disposed in such a relationship so as to define a first position wherein the apertures are in substantial alignment and a second position wherein the apertures are in substantial non-alignment. In this way, the configurable aerial vehicle aerosurface of the present invention can be configured from a first, low drag transport position, to a second, aerodynamic position to provide missile lift and control.

6 Claims, 4 Drawing Sheets

ABLE AERIAL VEHICLE
AEROSURFACE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to aerial vehicle aerosurfaces and more particularly, to a configurable aerial vehicle aerosurface for mounting on rockets, missiles and the like having reduced drag characteristics.

Rockets, missiles and like vehicles, hereinafter generally described as missiles, are conventionally provided with fixed and moveable aerosurfaces such as fins or wings for stabilizing and controlling vehicle flight though the atmosphere. As is well known, missiles are often carried in the open, underneath military aircraft for later deployment after the theatre of operations is reached. Today's military aircraft are designed for high performance applications and typically undergo high speed, high stress maneuvering in flight. Being carried in the open, underneath the aircraft, the missiles are directly exposed to undesirable atmospheric conditions such buffeting, etc. during flight and can be severely damaged.

Further, depending on the missile location, one or more of the missile aerosurfaces can also be subjected to severe stresses resulting from interaction of the atmosphere with the surfaces of the aircraft. For example, intense free vortices created from transient non-stable flight conditions such as throttle back or high angle of attack attitudes can be severe enough to cause physical damage to the aerosurfaces. Aerosurface position also is also a factor, because some aerosurfaces are subject to higher stress loading from atmospheric drag than others, depending on their position on the missile and their relative position to the various surfaces of the aircraft.

Numerous attempts have been made to date to reduce the effects of atmospheric drag and hence facilitate transport and reduce damage to missile aerosurfaces. For example, it is known to provide mechanical arrangements for folding the missile aerosurfaces during aircraft transport. The aerosurfaces are then unfolded or deployed concurrently with missile release. Representative of such arrangements is shown, for example, in U.S. Pat. No. 5,192,037 to Moorefield. Although somewhat effective, systems such as these tend to be complex, requiring the addition of intricate deployment mechanisms. This adds to system complexity, increases missile weight and cost.

A need exists therefore for a configurable aerial vehicle aerosurface exhibiting reduced drag qualities during aircraft transport. Such an aerosurface would exhibit reduced aerodynamic drag during aircraft transport and be configurable from a reduced drag position to an aerodynamic control surface position for missile lift and control, while not contributing appreciable weight or complexity to the missile.

SUMMARY OF THE INVENTION

Accordingly, it is a primary object of the present invention to provide a configurable aerial vehicle aerosurface overcoming the limitations and disadvantages of the prior art.

Another object of the present invention is to provide a configurable aerial vehicle aerosurface exhibiting reduced drag characteristics during aircraft transport.

Yet another object of the present invention is to provide a configurable aerial vehicle aerosurface having a first position exhibiting reduced drag during aircraft transport and a second, aerodynamic position for providing missile lift and control.

Still another object of the present invention is to provide a configurable aerial vehicle aerosurface that can quickly be reset from a low drag configuration to an aerodynamic configuration.

Yet another object of the present invention is to provide a configurable aerial vehicle aerosurface that is lightweight and can be easily retrofitted onto a wide variety of existing aerial vehicles.

Additional objects, advantages and other novel features of the invention will be set forth, in part, in the description that follows and will, in part, become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects and in accordance with the purposes of the present invention as described herein, a configurable aerial vehicle aerosurface is provided that is configurable from a low drag transport position to an aerodynamic position to provide vehicle lift and/or vehicle control.

The preferred embodiment of the configurable aerial vehicle aerosurface of the present invention selected to illustrate the invention includes a pair of airfoil surfaces. The first airfoil surface can be mounted either directly to the missile body or to the aerosurface control mechanism depending on application. Thus, when the configurable aerial vehicle aerosurface is utilized solely to provide aerodynamic lift, the first airfoil surface is fixedly mounted to the missile body. Conversely, when the configurable aerial vehicle aerosurface is utilized as flight path control surface, the first airfoil surface is mounted to the existing aerosurface control mechanism.

A second airfoil surface is slidably received within the first airfoil surface. Together, and as will be described in more detail below, the first and second airfoil surfaces combine to form the configurable aerial vehicle aerosurface.

Each airfoil surface contains a plurality of apertures passing transversely therethrough. According to an important aspect of the present invention, each aperture in the first airfoil surface has a counterpart of like size and shape in the second airfoil surface. However, while the apertures are of like size and shape, they are offset from each other along the longitudinal axis. In this way, the second airfoil surface can be placed in a first position wherein the apertures are in alignment, allowing fluid passage therethrough, and a second position wherein the apertures are in non-alignment, preventing fluid passage.

Advantageously, the configurable aerial vehicle aerosurface of the present invention provides substantially reduced drag in the first position because air flows through passages created by the aligned apertures from one side of the aerosurface to the other. This serves to dramatically reduce the damaging effects of turbulent air and free vorticular airflow impingement on the aerosurface, allowing missiles to be carried under aircraft in a more secure, safer manner.

As the missile is released, a pyrotechnic actuator is ignited. The actuator causes the second aerosurface to slide to the second position wherein the apertures are in non-alignment. This closes off the passages through the apertures, preventing further airflow through the aerosurface. In this position, the aerosurface is fully functional as a lift or control surface suitable to guide the missile during flight.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
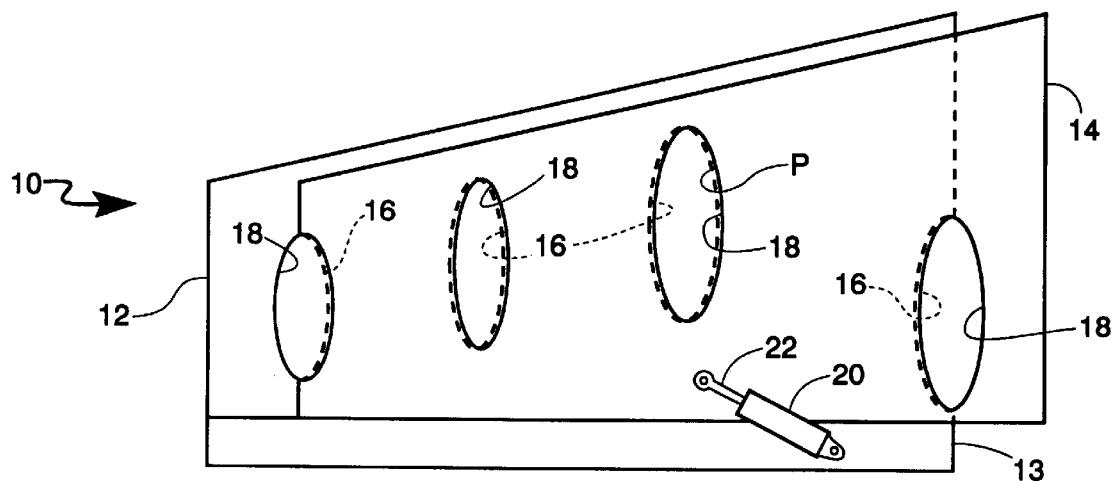
FIG. 1 is a plan view of the configurable aerial vehicle aerosurface of the present invention showing the airfoil surfaces configured to the low drag transport position.

Reference is made to FIG. 1, showing the configurable aerial vehicle aerosurface 10 of the present invention. As shown, in FIGS. 1, 2, 3A and 3B, the configurable aerial vehicle aerosurface 10 includes a first airfoil surface 12 and a second airfoil surface 14. The first airfoil surface 12 includes a base 13. Advantageously, the base 13 provides a suitable attachment point for the configurable aerial vehicle aerosurface of the present invention on missile surfaces. The base 13 can either be attached to the existing missile aerosurface control mechanism or fixedly attached to the missile body thereby facilitating retrofit on existing missiles. The second airfoil surface 14 is slidably received within the first airfoil surface 12. Together the first and second airfoil surfaces 12, 14 combine to form the desired aerial vehicle aerosurface 10 of the present invention.

Figure 2:
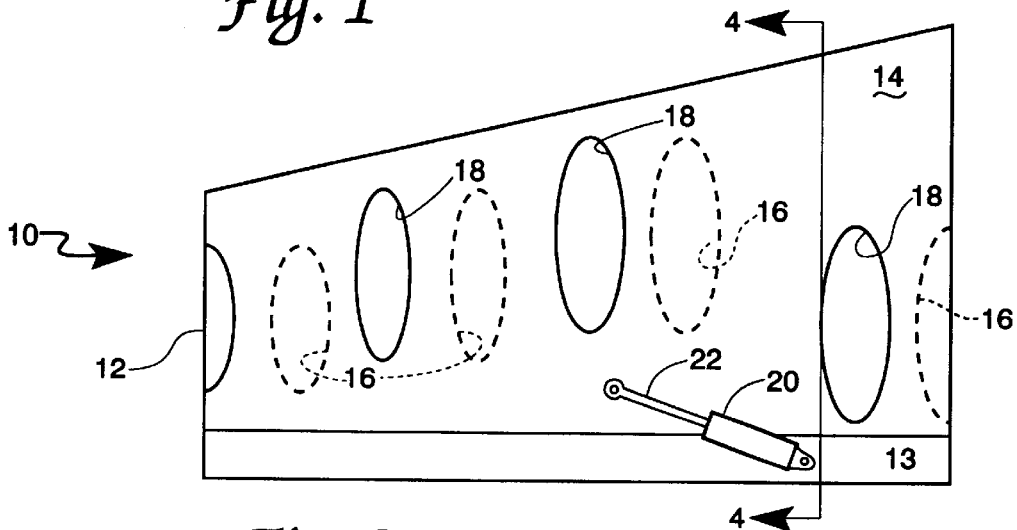
FIG. 2 is a plan view of the configurable aerial vehicle aerosurface of the present invention showing the airfoil surfaces configured to the aerodynamic position.
Figure 3A:
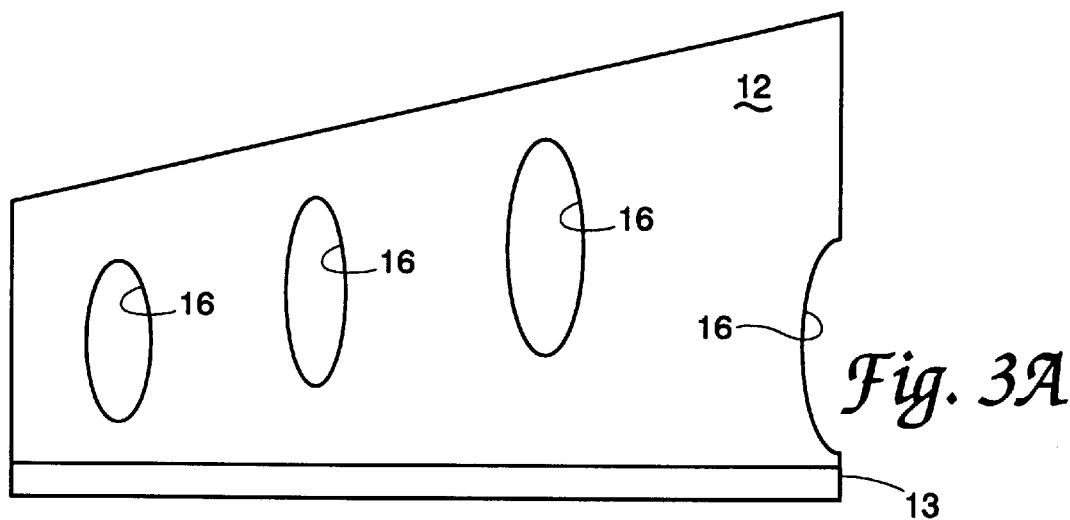
FIG. 3A is a plan view of a representative first airfoil surface of the configurable aerial vehicle aerosurface of the present invention.
Figure 3B:
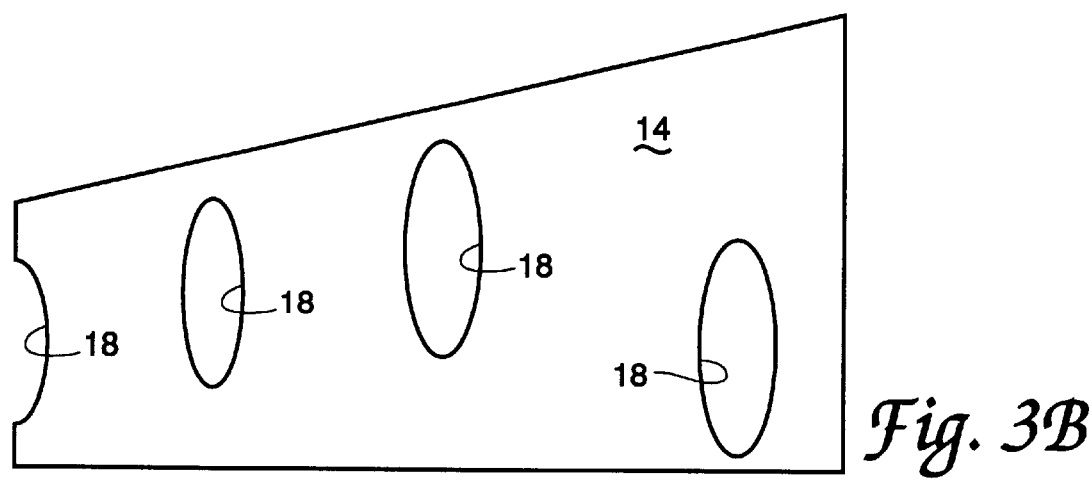
FIG. 3B is a plan view of a representative second airfoil surface of the configurable aerial vehicle aerosurface of the present invention.
Figure 6:
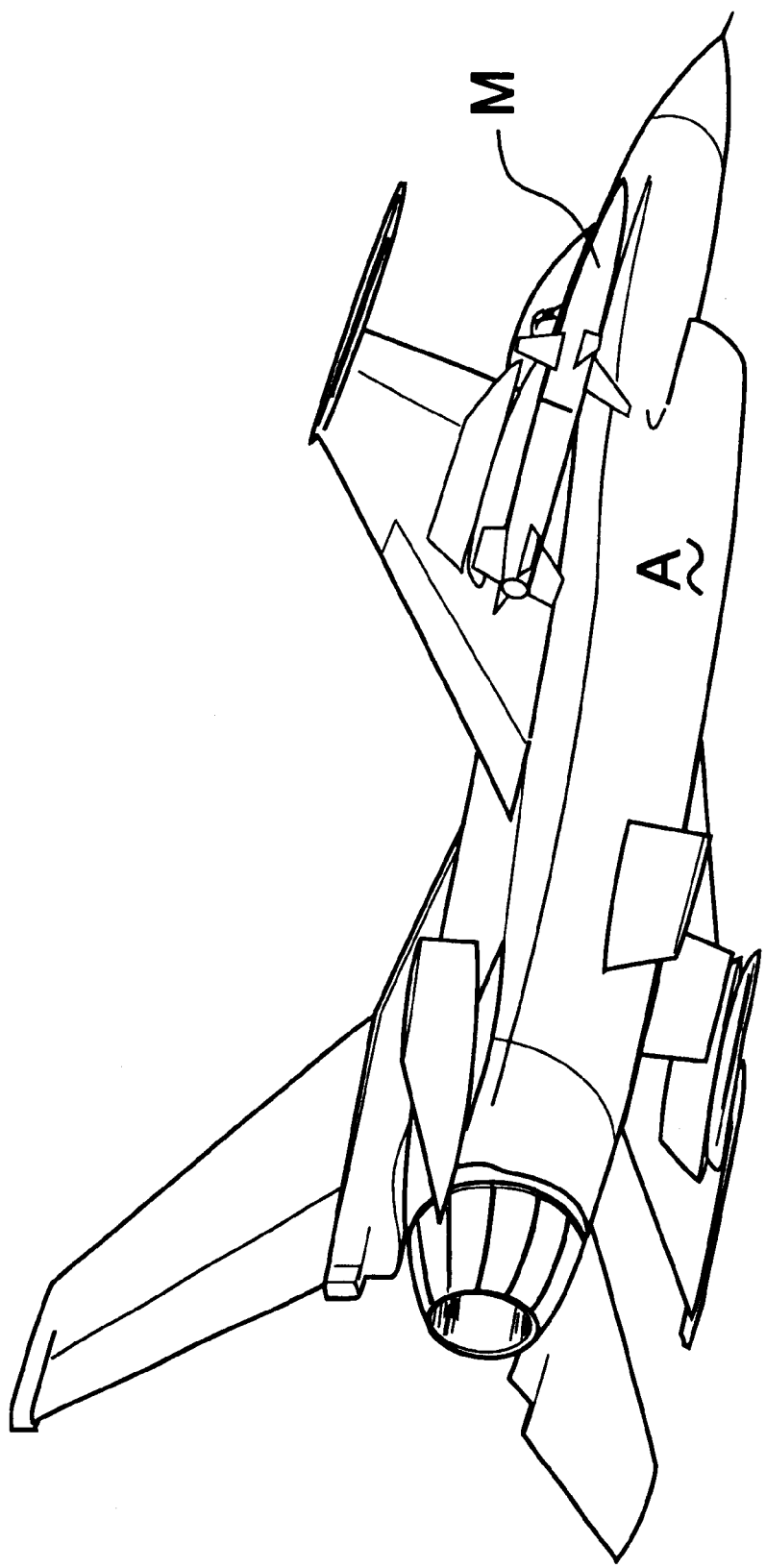

According to an important aspect of the present invention, each airfoil surface 12 and 14 contains a plurality of apertures 16, 18 respectively, passing transversely therethrough. As shown, the apertures 16, 18 are arranged such that each aperture 16 has a corresponding aperture 18 of like size and shape. While the size, number and position of the apertures 16 and 18 will vary depending on application, in the preferred embodiment, the apertures 16, 18 are intended to comprise approximately ⅓ of the overall aerosurface area. As shown in FIGS. 1 and 2, the apertures 16, 18 are disposed along the longitudinal axis so as to define a first position wherein they are in substantial alignment (FIG. 1) and a second position wherein they are in substantial non-alignment (FIG. 2). As can be appreciated, and as shown in FIG. 1 when the apertures 16 and 18 are in substantial alignment, fluid passages P are created allowing free fluid exchange of air through the first and second airfoil surfaces 12 and 14. This first position advantageously provides low drag due to the ready transference of air through the passages P to dramatically reduce the damaging effects of turbulent air and free vorticular impingement on the aerosurface 10 during missile transport. See, for example, FIG. 6 wherein a representative missile M is shown being transported by aircraft A.

As shown in FIG. 2, the first and second airfoil surfaces 12 and 14 respectively, can be placed in a second, non-alignment position. Since the apertures 16 and 18 are in non-alignment, the fluid passages P, created in the first position, no longer exist. As such, fluid flow through the aerosurface is prevented. This second position thus defines a fully functional aerodynamic lift or control aerosurface suitable to guide the missile during flight.

Figure 4:
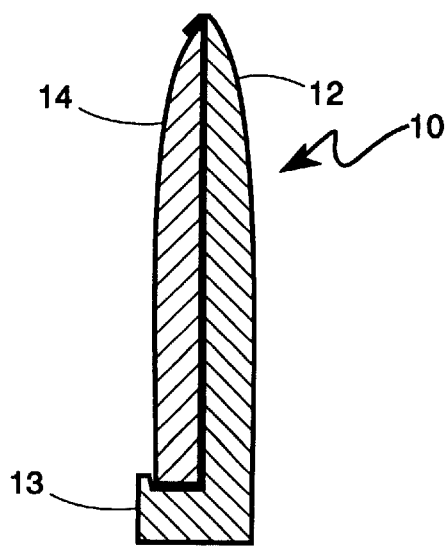
FIG. 4 is a sectional view taken along section lines 4—4 of FIG. 2.

Reference is now made to FIG. 4, a sectional view of FIG. 2. As shown the second airfoil surface 14 is adapted for sliding engagement with the first airfoil surface 12. As illustrated, the first and second airfoil surfaces 12 and 14 combine to form the configurable aerial vehicle aerosurface 10 of the present invention.

As shown in FIGS. 1 and 2, an actuator 20 operatively engages the first and second airfoil surfaces 12 and 14. The actuator 20 serves to move the airfoil surface 14 from the first position wherein the apertures 16 and 18 are in substantial alignment to the second position wherein the apertures 16 and 18 are in substantial non-alignment. In the preferred embodiment, the actuator is an explosive pyrotechnic device, suitably secured at its head end on the base 13 of the first airfoil surface 12. A piston rod 22 is pivotally secured to the second airfoil surface 14. During operation, the actuator is ignited simultaneously with release of the missile. The gas generated within the actuator quickly expands, forcing the piston rod outwardly, thereby forcing the second airfoil surface 14 to move according to its sliding engagement with the first airfoil surface 12. In this way, the conversion of the configurable aerial vehicle aerosurface from a first, low drag position to a second, aerodynamic position is effected. As can be appreciated, any number of types and styles of actuators known to those skilled in the art can be implemented to provide the desired airfoil surface movement.

Figure 5A:
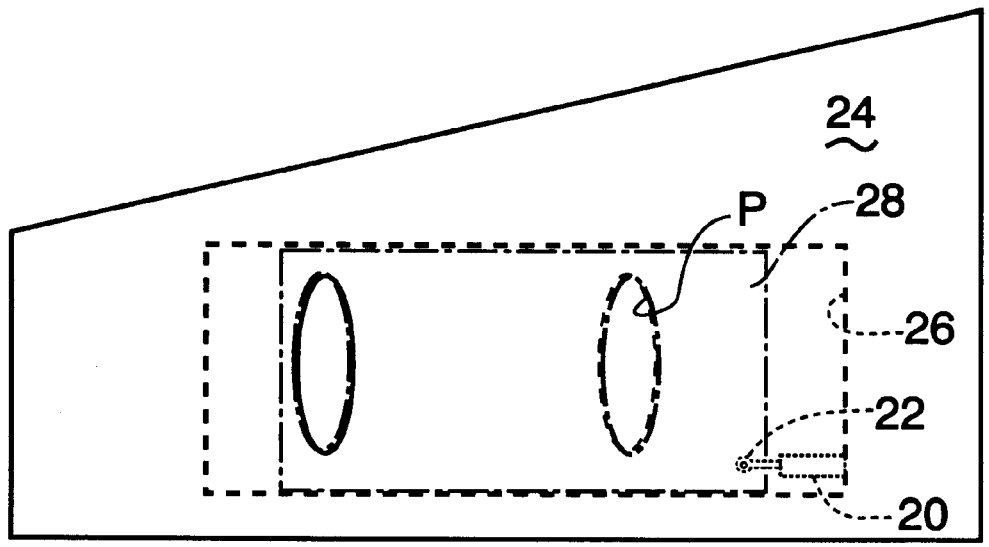
FIG. 5A is a plan view of an alternative embodiment of the configurable aerial vehicle aerosurface of the present invention showing the low drag transport position configuration.
Figure 5B:
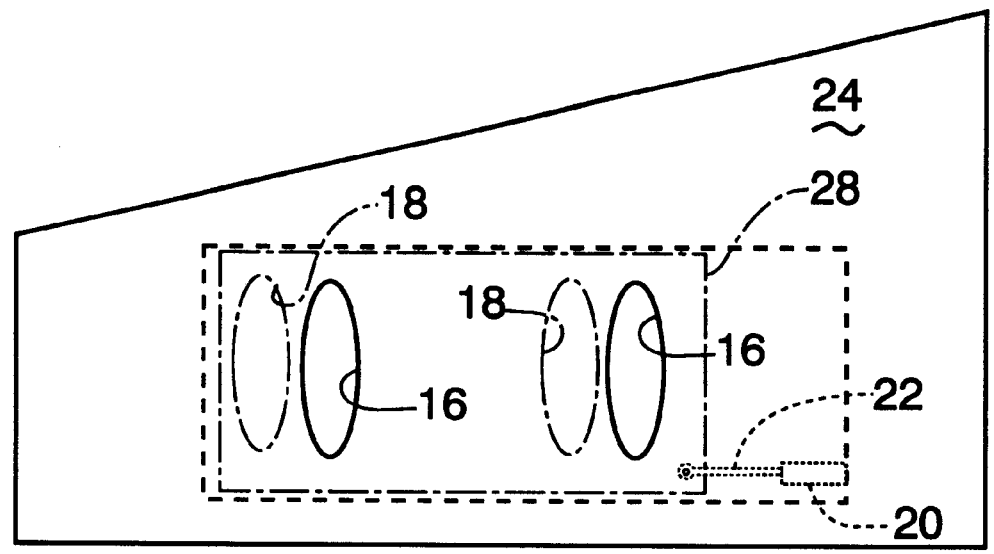
FIG. 5B is a plan view of an alternative embodiment of the configurable aerial vehicle aerosurface of the present invention showing the aerodynamic position configuration; and, FIG. 6 is a perspective view of an aircraft showing a representative missile being transported.

An alternative embodiment of the configurable aerial vehicle aerosurface 10 of the present invention is shown in FIGS. 5A and 5B. As shown, an aerosurface 24 includes an internal cavity 26. An aperture plate 28 is slidably received within the cavity 26. As shown, this alternative embodiment includes the apertures 16 and 18. Actuator 20 is utilized to move the aperture plate 28 from the first position wherein the apertures 16 and 18 are in alignment, to the second position wherein the apertures 16 and 18 are in non-alignment. Again, and as stated above, when the apertures 16 and 18 are in alignment, passages P are created, allowing fluid exchange of air from the first side of the aerosurface to the second side.

In summary, numerous benefits have been described from utilizing the principles of the present invention. The configurable aerial vehicle aerosurface 10 of the present invention includes first and second airfoil surfaces, 12 and 14 respectively in sliding engagement. A plurality of apertures 16 and 18 are provided in such a relationship so as to define a first position wherein the apertures are in substantial alignment and a second position wherein the apertures are in substantial non-alignment. In this way, the configurable aerial vehicle aerosurface 10 of the present invention can be configured from a first, low drag transport position, to a second, aerodynamic position to provide missile lift and control.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. An aerial vehicle aerosurface, comprising:

a first airfoil surface having at least one aperture passing transversely therethrough; and, a second airfoil surface slidably received within said first airfoil surface, said second airfoil surface having at least one aperture of like kind passing transversely therethrough, said second airfoil surface being positionable with respect to said first airfoil surface to define a first position wherein said apertures in said airfoil surfaces are in substantial alignment and a second position wherein said apertures are in substantial non-alignment, said first and second airfoil surfaces in combination forming the aerial vehicle aerosurface.

2. The aerosurface of claim 1 further including an actuator in operative engagement with said second airfoil surface to move said second airfoil surface from said first position to said second position.

3. The aerosurface of claim 2 wherein said actuator is an explosive pyrotechnic device.

4. An aerial vehicle aerosurface, comprising:

an aerosurface having first and second sides; said aerosurface having an internal cavity formed therein; said aerosurface having at least one aperture passing transversely therethrough from said first side to said second side; and, an inner aperture plate slidably received within said cavity, said aperture plate having at least one aperture of like kind, said aperture plate being positionable from a first position wherein said apertures are in substantial alignment and a second position wherein said apertures are in substantial non-alignment.

5. The aerosurface of claim 4 further including an actuator in operative engagement with said aperture plate to move said aperture plate from said first position to said second position.

6. The aerosurface of claim 5 wherein said actuator is an explosive pyrotechnic device.

* * * * *